US005935438A

United States Patent [19]

Greiner-Stürmer

[11] Patent Number: 5,935,438

[45] Date of Patent: Aug. 10, 1999

[54] PUSHER CENTRIFUGE

[75] Inventor: Fritz Greiner-Stürmer, Heiligenhaus, Germany

[73] Assignee: Siebtechnik GmbH, Mulheim/Ruhr, Germany

[21] Appl. No.: 08/894,857

[22] PCT Filed: Dec. 6, 1996

[86] PCT No.: PCT/DE96/02345

§ 371 Date: Aug. 8, 1997

§ 102(e) Date: Aug. 8, 1997

[87] PCT Pub. No.: WO97/21491

PCT Pub. Date: Jul. 19, 1995

[30] Foreign Application Priority Data

Dec. 9, 1995 [DE] Germany .............................. 19546019

[51] Int. Cl.[6] ...................................................... B01D 33/06

[52] U.S. Cl. ............................................ 210/376; 210/374

[58] Field of Search .................................... 210/372, 374, 210/376, 369, 360.1, 377, 380.3

[56] References Cited

U.S. PATENT DOCUMENTS

| | | | |
|---|---|---|---|
| 4,073,731 | 2/1978 | Fanta | 210/376 |
| 4,226,724 | 10/1980 | Sturmer | 210/376 |

FOREIGN PATENT DOCUMENTS

| | | |
|---|---|---|
| 1030771 | 5/1958 | Germany . |
| 2706501 | 8/1978 | Germany . |
| 2848156 | 6/1979 | Germany . |
| 4308749 | 4/1994 | Germany . |

*Primary Examiner*—David A. Reifsnyder
*Attorney, Agent, or Firm*—Robert W. Becker & Associates

[57] ABSTRACT

A pusher centrifuge has a housing and a centrifuge drum arranged in the housing. A pusher bottom is arranged in the centrifuge drum. A filler pipe is connected to the housing and extends concentrically into the centrifuge drum. Material to be centrifuged is introduced into the centrifuge drum through the filler pipe in a direction of filling. A distribution cone is positioned downstream of the filler pipe in the centrifuge drum. The distribution cone has a wide end and a narrow end. The wide end is positioned facing the pusher bottom and spaced from the pusher bottom by an annular gap. An annular cup is arranged at the pusher bottom and projects concentrically from the pusher bottom into the centrifuge drum. It surrounds the wide end of the distribution cone.

9 Claims, 3 Drawing Sheets

PUSHER CENTRIFUGE

BACKGROUND OF THE INVENTION

The invention relates to a pusher centrifuge with a centrifuge drum, a pusher bottom, a filler pipe for the material to be centrifuged connected to the centrifuge housing and extending coaxially into the centrifuge drum, and a distribution cone positioned downstream of the filler pipe and concentric thereto having its end with the greater diameter facing the pusher bottom at a distance so as to leave an annular gap.

In pusher centrifuges of this type there is a need to accelerate the material to be centrifuged, for increasing the throughput while at the same time gently treating sensitive solid particles and reducing wear at the centrifuge, especially wear of the slotted screen in the supply area, to the angular velocity of the solid particle cake within the centrifuge drum.

In an attempt to solve this problem, in a pusher centrifuge known from German Patent DE 28 48 156 C2 the material to be centrifuged is unsatisfactorily preaccelerated through a guiding wall, extending perpendicularly to the centrifuge axis, to an angular velocity of the filter cake formed so that a spontaneous dewatering, required for forming a push-resistance solid particle cake within the supply area, cannot be ensured. This results in a reduction of the mass throughput within the pusher centrifuge. From German Patent 43 08 749 a pusher centrifuge is furthermore known in which the material to be centrifuged is accelerated to a high velocity by a pump wheel-like insert between the pusher bottom and the guide disk. However, the constructively resulting high radial acceleration component, which is even further enhanced by the number of the pump wheel vanes, results in great wear of the slotted screen coating within the supply area.

The object of the invention is therefore to provide a pusher centrifuge with which solid materials can be separated from liquids with optimal mass throughput and with reduced wear of the slotted screen coating within the supply area.

SUMMARY OF THE INVENTION

Inventively, this object is solved in that an annular cup is fastened at the pusher bottom which concentrically surrounds the end of the distribution cone and which projects into the centrifuge drum.

A pusher centrifuge according to the present invention is primarily characterized by:

a housing;

a centrifuge drum arranged in the housing;

a pusher bottom arranged in the centrifuge drum;

a filler pipe, connected to the housing and extending concentrically into the centrifuge drum, wherein material to be centrifuged is introduced into the centrifuge drum through the filler pipe in a direction of filling;

a distribution cone positioned downstream of the filler pipe in the centrifuge drum;

the distribution cone having a wide end and a narrow end, the wide end positioned facing the pusher bottom and spaced from the pusher bottom by an annular gap;

an annular cup arranged at the pusher bottom and projecting concentrically from the pusher bottom into the centrifuge drum and surrounding the wide end of the distribution cone.

The annular cup defines a groove facing the wide end of the distribution cone, the groove having a bottom of a part-polygonal cross-sectional contour.

The annular cup has an outer, part-polygonal cross-sectional contour.

The radial spacing between the annular cup and an inner wall of the centrifuge drum is selected based on constructive specifications and operative data of the pusher centrifuge and the material to be centrifuged so that during operation of the pusher centrifuge a filter cake is formed within the centrifuge drum radially outside of the annular cup.

An outer radius Ra of the annular cup, relative to an inner radius Ri of the centrifuge drum and an effective length ls of a screen of the centrifuge drum, is within a range of $Ra=Ri-0.15\ ls$ and $Ra=Ri-0.22\ ls$.

The annular cup is fastened to the pusher bottom and comprises axial drain openings extending through the pusher bottom.

The centrifuge may further comprise a sealing ring extending radially outwardly from the annular cup for sealing the pusher bottom relative to the centrifuge drum.

The distribution cone is fastened to the pusher bottom.

The distribution cone preferably is fastened to the filler pipe.

Due to the centrifugal force the annular cup is at any given time filled with material to the overflow edge. The continuously fed material is accelerated within the annular cup by the rotating suspension ring in a gentle manner to the angular velocity of the annular cup and is supplied accross the overflow edge in the form of a uniform overflowing suspension film onto the formed solid particle cake.

BRIEF DESCRIPTION OF THE DRAWINGS

One embodiment of the invention is represented in the drawing and will be explained in the following.

DESCRIPTION OF PREFERRED EMBODIMENTS

Figure 1:
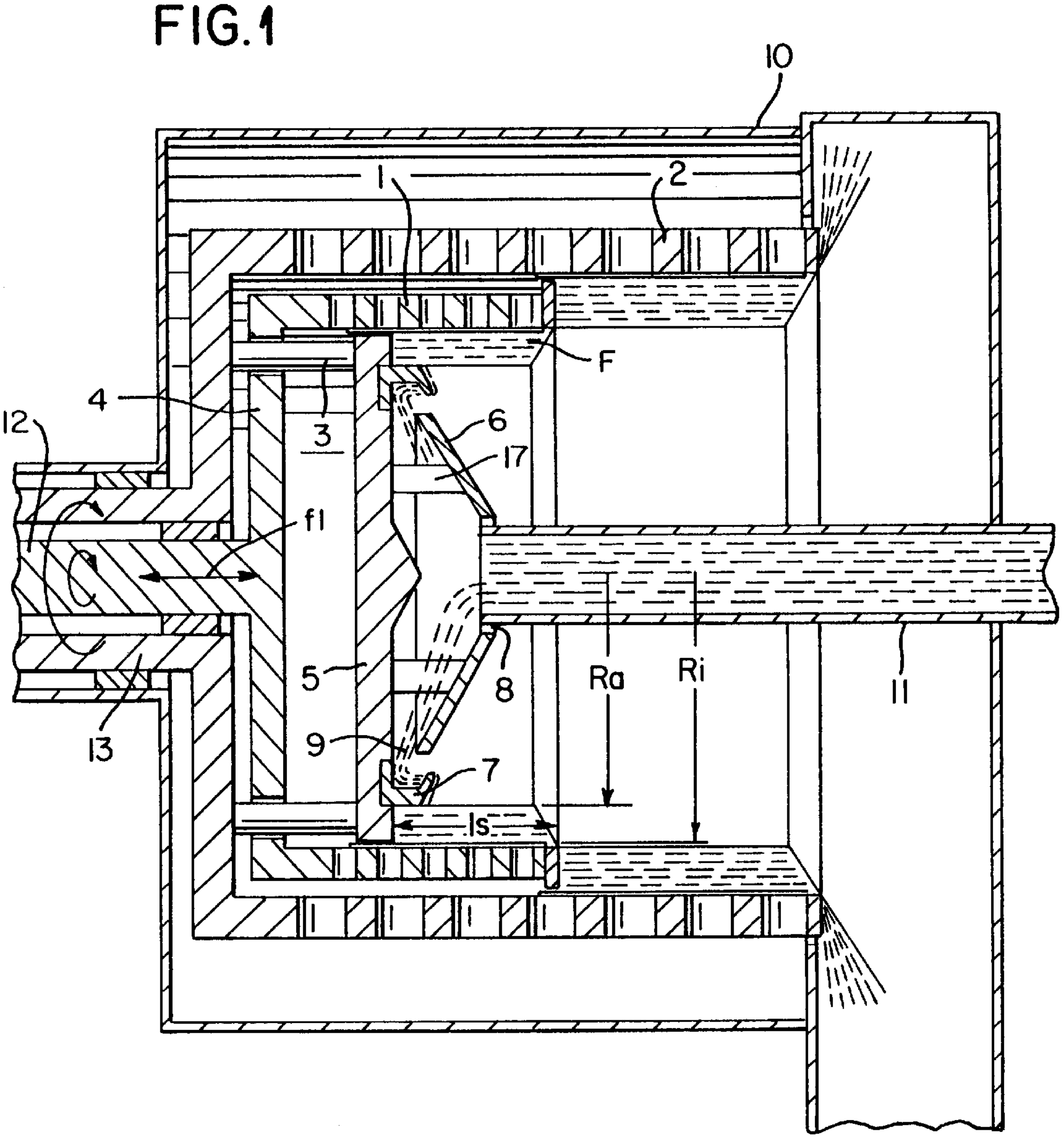
FIG. 1 shows a longitudinal section of the inventive pusher centrifuge.

The centrifuge represented in FIG. 1 is a pusher centrifuge with an inner and an outer centrifuge drum 1 and 2. The pusher bottom 5 is fastened to the outer centrifuge drum by spacing bolts 3 which penetrate the bottom 4 of the inner centrifuge drum 1. The pusher bottom 5 supports the distribution cone 6 and an annular cup 7.

The distribution cone 6 has a central opening 8. Together with the pusher bottom 5 the distribution cone 6 forms the annular gap 9.

A filler pipe 11 projects into the central opening 8 and is fixedly connected to the centrifuge housing 10 for supplying the material to be centrifuged.

The inner and the outer centrifuge drums 1 and 2 have concentrical shafts 12 and 13 which are rotatably supported within the centrifuge housing whereby the shaft 12 of the inner centrifuge drum 1 performs a reciprocating lifting movement in the direction of the double arrow f1 in addition to the rotational movement.

Figure 2:
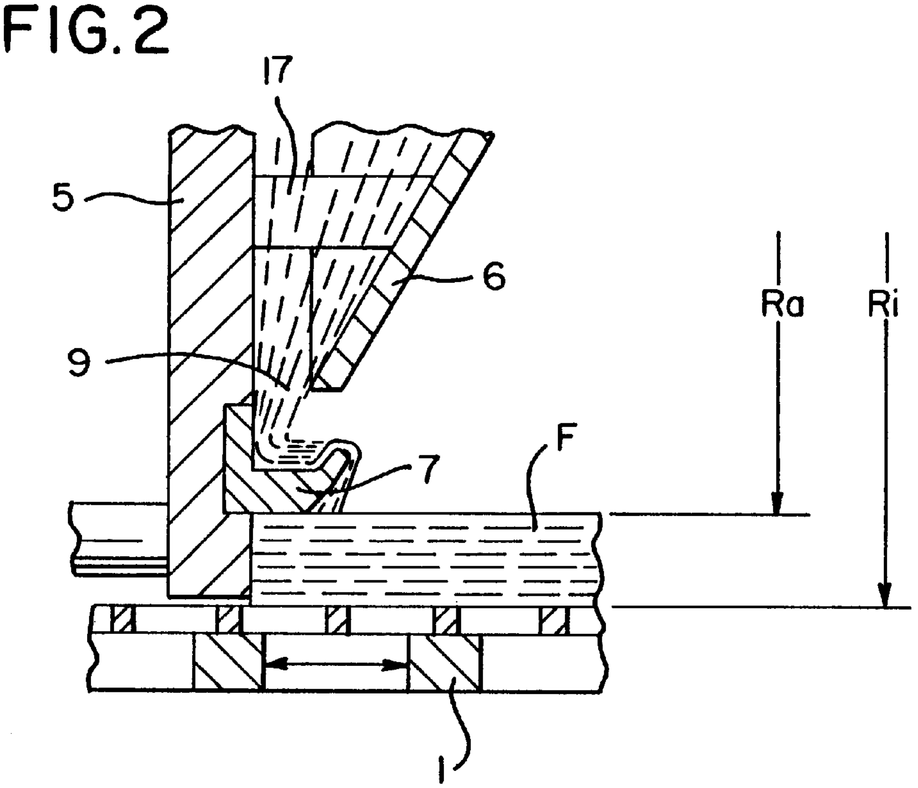
FIGS. 2 through 5 show in an enlarged representation sectional views of inventively amended details of the inventive pusher centrifuge.

FIG. 2 shows the pusher bottom 5 with distribution cone 6 connected thereto by fastening ribs 17 and also the annular cup 7 connected to the pusher bottom 5.

Figure 3:
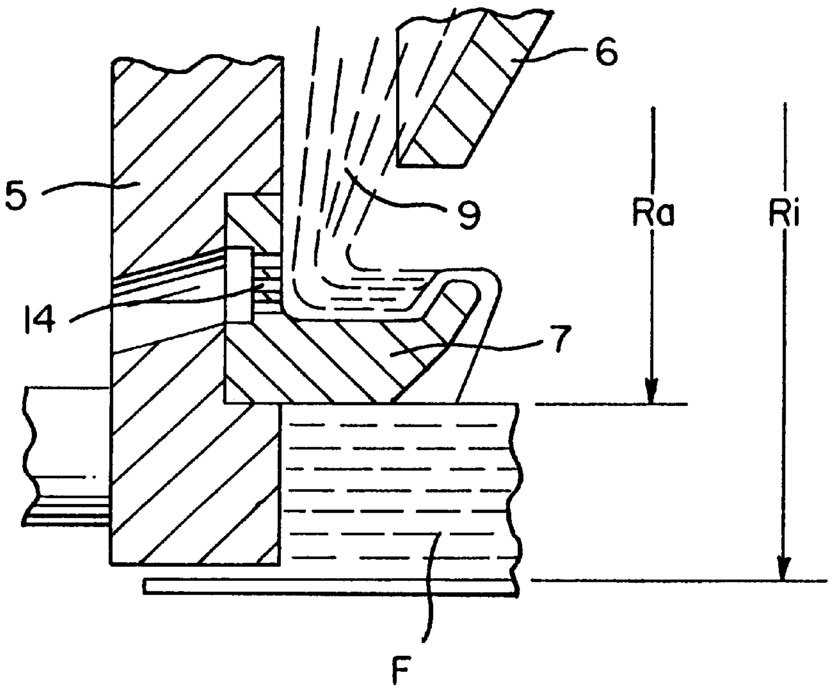

FIG. 3 shows the annular cup 7 with additionally axially oriented drain openings 14 for a preliminary dewatering through the pusher bottom 5.

Figure 4:
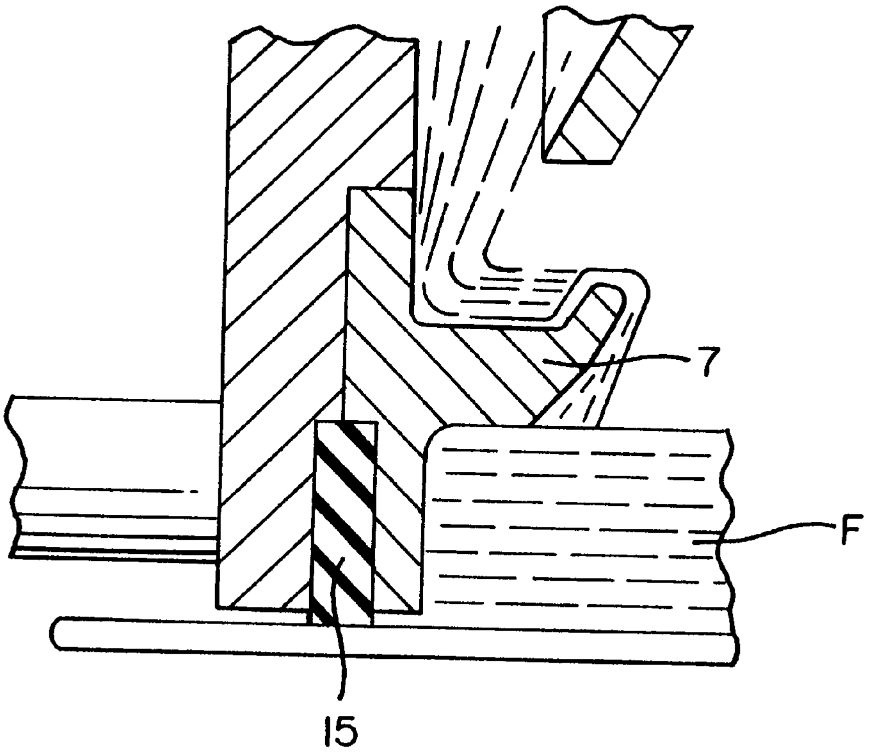

FIG. 4 shows the annular cup 7 with integrated pusher bottom sealing ring 15.

Figure 5:
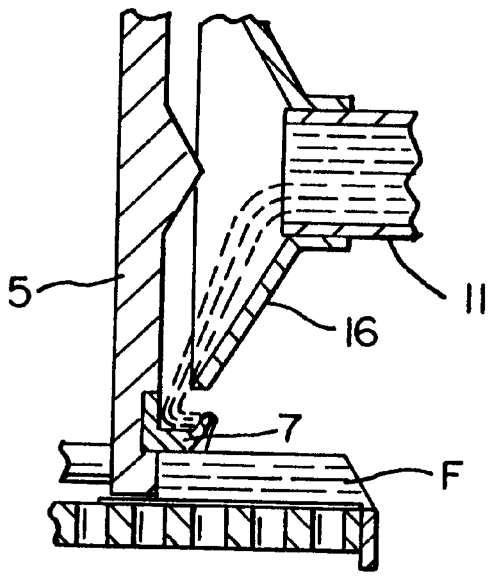

FIG. 5 shows the pusher bottom 5 with the annular cup 7 and with a distribution cone 16 connected to the filler pipe 11 so that fastening ribs 17 (FIG. 2) exposed to great wear can be eliminated also for a more gentle material supply.

In all of the disclosed embodiments the annular cup 7 has a groove facing the distribution cone 6, 16 whereby the bottom of the annular cup has a polygonal contour which also is true for the outer contour of the annular cup 7.

The radial spacing of the annular cup from the inner mantle of the centrifuge drum is to be determined as a function of the predetermined construction data and operational data of the centrifuge and the consistency of the material to be centrifuged such that during operation of the centrifuge the filter cake F forming within the centrifugal drum is positioned exterior to the annular cup 7, i.e., the annular cup 7 may not become immersed in the filter cake F to be formed. The outer radius Ra of the annular cup 7, relative to the inner radius Ri and the useful length of the screen ls of the centrifugal drum, is preferably in the range of Ra=Ri- 0.15 ls to Ra=Ri- 0.22 ls.

The present invention is, of course, in no way restricted to the specific disclosure of the specification and drawings, but also encompasses any modifications within the scope of the appended claims.

I claim:

1. A pusher centrifuge comprising:

a housing;

a centrifuge drum arranged in said housing;

a pusher bottom arranged in said centrifuge drum;

a filler pipe, connected to said housing and extending concentrically into said centrifuge drum, wherein material to be centrifuged is introduced into said centrifuge drum through said filler pipe in a direction of filling;

a distribution cone positioned downstream of said filler pipe in said centrifuge drum;

said distribution cone having a wide end and a narrow end, said wide end positioned facing said pusher bottom and spaced from said pusher bottom by an annular gap;

an annular cup arranged at said pusher bottom and projecting concentrically from said pusher bottom into said centrifuge drum;

said annular cup defining a groove facing the distribution cone and having a radially inwardly extending overflow edge spaced farther from said pusher bottom than said wide end of said distribution cone such that said annular cup surrounds said wide end of said distribution cone.

2. A pusher centrifuge according to claim 1, wherein said groove has a bottom of a part-polygonal cross-sectional contour.

3. A pusher centrifuge according to claim 1, wherein said annular cup has an outer, part-polygonal cross-sectional contour.

4. A pusher centrifuge according to claim 1, wherein said annular cup has an outer wall extending parallel to an inner wall of said centrifuge drum, wherein a radial spacing between said outer wall of said annular cup and said inner wall of said centrifuge drum is selected based on constructive specifications and operative data of said pusher centrifuge and the material to be centrifuged so that during operation of said pusher centrifuge a filter cake is formed within said centrifuge drum radially outside of said outer wall of said annular cup.

5. A pusher centrifuge according to claim 4, wherein an outer radius Ra of said outer wall of said annular cup, relative to an inner radius Ri of said centrifuge drum and an effective length ls of a screen of said centrifuge drum, is within a range of Ra=Ri- 0.15 ls and Ra=Ri-0.22 ls.

6. A pusher centrifuge according to claim 1, wherein said annular cup is fastened to said pusher bottom and comprises axial drain openings extending through said pusher bottom.

7. A pusher centrifuge according to claim 6, further comprising a sealing ring extending radially outwardly from said annular cup for sealing said pusher bottom relative to said centrifuge drum.

8. A pusher centrifuge according to claim 1, wherein said distribution cone is fastened to said pusher bottom.

9. A pusher centrifuge according to claim 1, wherein said distribution cone is fastened to said filler pipe.

* * * * *